Nov. 19, 1968   J. H. HOPPER   3,411,233
RETRACTABLE FISHHOOK
Filed Oct. 21, 1965
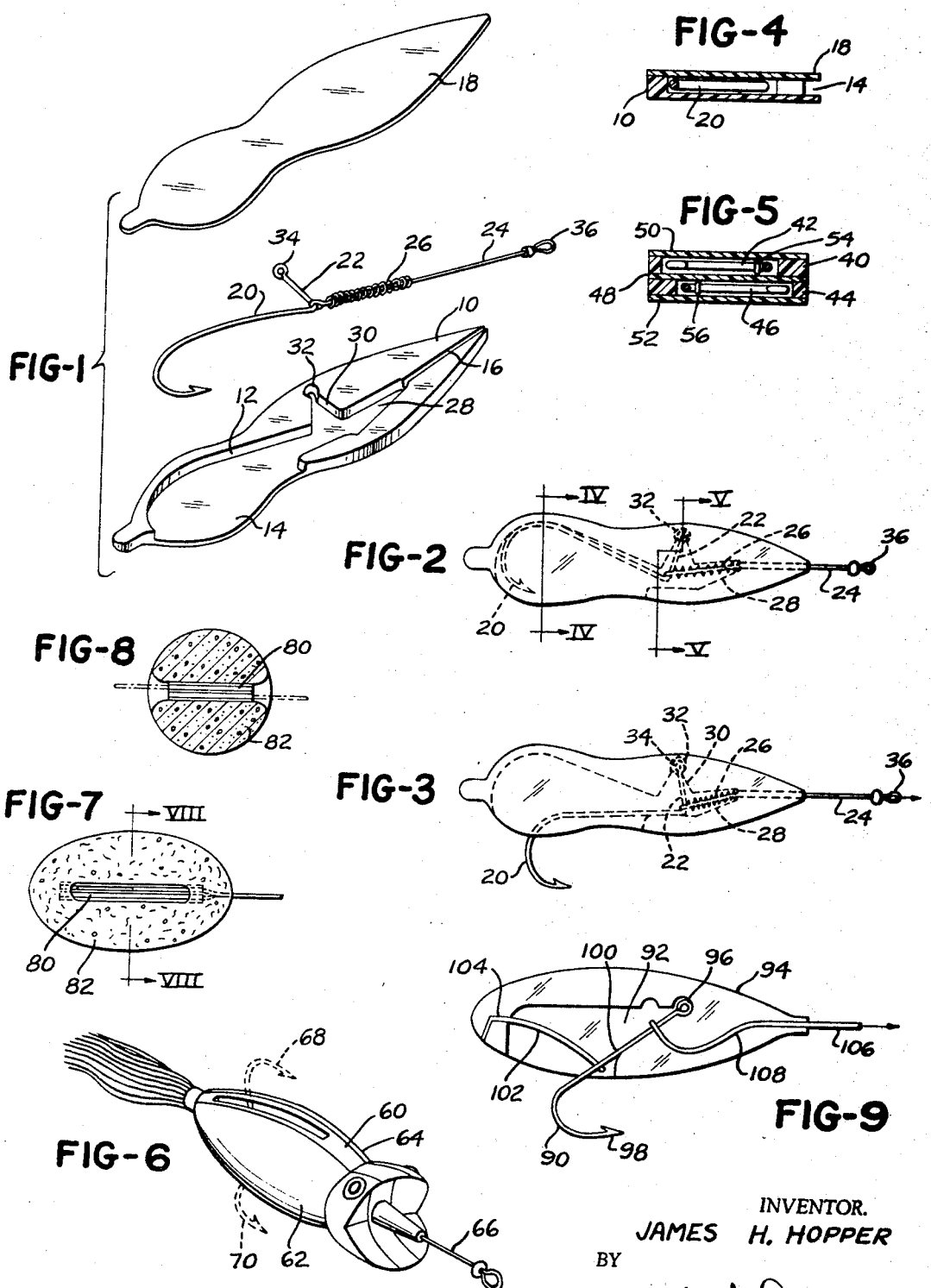
INVENTOR.
JAMES H. HOPPER
BY
Melvin H. Peasley United States Patent Office 3,411,233
Patented Nov. 19, 1968

3,411,233
RETRACTABLE FISHHOOK
James H. Hopper, 1 Taylor Road,
Hazardville, Conn. 06036
Filed Oct. 21, 1965, Ser. No. 499,606
2 Claims. (Cl. 43—35)

ABSTRACT OF THE DISCLOSURE

Fishing lure of the weedless type having a body with a cavity in which at least one hook is pivotally supported. The hook is spring-urged toward retracted position within the cavity and a line is attached to the hook so that when a pulling force is developed on the line, the hook will move to a position in the cavity wherein the point of the hook is outside the cavity.

---

This invention relates to fisherman's equipment and is in particular concerned with a novel hook arrangement of the weedless type.

So-called weedless lures and hook arrangements are known but heretofore none has been entirely satisfactory and many times extra equipment such as sliding members on the line, etc., is required. Sometimes weed guards are employed with the hooks which are relatively stiff and which can interfere with hooking of the fish and which make it difficult to remove a hook because the weed guard must be compressed.

With the foregoing in mind, the primary object of the present invention is the provision of a weedless lure or hook arrangement for fishermen which overcomes the drawbacks referred to above.

Another object of this invention is the provision of a lure or hook arrangement which is inexpensive to manufacture and which substantially entirely eliminates all chance of accidently snagging the hook or of the hook becoming caught on weeds or the like.

Still another object is the provision of a fishing lure or hook arrangement which eliminates danger in connection with attaching the lure to a line or removing it therefrom and which can easily be stored, without becoming entangled with others, in a tackle box.

The foregoing objects as well as other objects and advantages of the present invention will become more apparent upon reference to the following specification taken in connection with the accompanying drawings in which:

FIGURE 1 is an exploded perspective of the basic form which the weedless lure or hook according to the present invention takes;

FIGURE 2 is a side elevational view of a weedless hook assembly showing the hook retracted;

FIGURE 3 is a view like FIGURE 2 but shows the hook extended into hooking position;

FIGURE 4 is a cross sectional view indicated by line IV—IV on FIGURE 2;

FIGURE 5 is a sectional view which is indicated by line V—V on FIGURE 2 but showing a double hook arrangement instead of the single hook arrangement of FIGURES 1 through 3;

FIGURE 6 is a perspective view of a plug embodying a double hook arrangement according to the present invention showing the hooks dot-dashed in extended position;

FIGURE 7 is a side elevational view of a plug embodying the hook arrangement according to the present invention, said plug having a resilient rubber-like body;

FIGURE 8 is a cross section indicated by VIII—VIII on FIGURE 7; and

FIGURE 9 is a view showing a modification.

Referring to the drawings somewhat more in detail, in FIGURE 1 a main body member 10 is illustrated which has a shallow cavity or recess 12 formed therein which, at one side, at 14 opens out through the side of the body. Cavity or recess 12 communicates at one end through a narrow elongated groove 16 with the front end of the body. The cavity is adapted for being closed by a planar cover plate 18 the same shape in plan as body 10 and these two members can be cemented, riveted or screwed together, or otherwise secured together, to form the final assembly.

A special hook 20 is provided which has the shank near the end opposite the hook end, namely, near the eye end, bent back as at 22. Attached to the bent back portion near the bend in the hook is a pull strand such as wire 24 adapted for extending through elongated groove 16. A spring 26 surrounds wire 24 and is adapted for being received in the neck portion 28 of cavity or recess 12.

Cavity or recess 12 has an angularly offset portion 30 terminating at a rounded end portion 32. Portion 32 is adapted for pivotally receiving eye 34 of the hook and portion 30 is adapted for receiving the bent back portion 22 of the shank of the hook. Wire 24, at its end opposite the connection with the hook, is provided with a loop 36 or other means for connection to a line.

When the parts are assembled they appear in plan as shown in FIGURE 2. At this time, spring 26 bears on the bent back portion 22 of the hook near the bend in the hook and urges the hook into retracted position in recess or cavity 12 as shown in FIGURE 2. Upon a pull being exerted on wire 24, however, the hook will pivot about the eye end thereof in the body and will extend therefrom as shown in FIGURE 3. The spring 26 is relatively light but in handling the assembly the hook does not come out of the body through the side opening of the recess. However, upon a lure, of which the hook assembly forms a part, being taken by a fish, a strong enough pull will be exerted on the lure for the hook to project out the side of the body through opening 14 and hook the fish.

The showing in FIGURES 1, 2 and 3 are those of a single hook but it will be apparent that the assembly could be combined with another, substantially identical, but with the hook coming out the opposite side of the body and this would result in a hook arrangement in which hooks projected from both sides of the body when the wire leading to the leader or other attaching means for the hook was pulled.

FIGURE 5 shows such an arrangement and, in FIGURE 5, 40 represents one body and 42 represents the hook therein. 44 represents the other body and 46 represents the hook in the other body. A thin member 48 is disposed between the bodies and relatively thin cover sheets 50 and 52 close the outer faces of the combined body.

The wires for actuating the hooks, which are shown at 54 and 56, lead through grooves similar to groove 16 and these grooves are preferably formed in the sides of the body 40 and 44 adjacent central member 48, so that the wires pertaining to the individual hooks can be brought together and lead to a single connecting device. Both hooks will thus be actuated simultaneously when the lure of which the hooks form a part, is taken by a fish.

It will be evident that more than two hooks could be utilized if so desired. For example, if the body portion were made triangular with cavities for hooks formed in each of the three sides, and three cover sheets applied, a lure having three hooks to project therefrom could readily be made.

It will also be evident that the hook assemblies could be connected in tandem if so desired and all of the hooks would then be actuated simultaneously upon pulling of the outermost lure a predetermined amount.

FIGURE 6 shows in perspective a plug embodying an assembly according to the present invention. In FIGURE 6, a hook assembly such as has been described above, in particular a double hook assembly, is indicated at 60 and on opposite sides of the assembly are body members 62 and 64 making up a substantially conventionally-shaped plug. The actuating wire for the hook is shown at 66 and the hooks themselves are normally retracted completely within the body but will project therefrom as shown in dot-dash outlines at 68 and 70 in FIGURE 6.

In FIGURES 7 and 8 the assembly embodying the two retractable hooks is indicated at 80 and it is contained within a rubber-like body 82 which may, for example, be sponge rubber or the like. The body may, furthermore, be resilient so that the body can be made separately from the hook assembly and the hook assembly thereafter inserted therein. In this manner the bodies of the plugs can be changed or taken apart for repair of the hook assembly if necessary.

It will be evident that a plug or lure or the like utilizing the retractable hook arrangement of the present invention substantially completely eliminates snags either when the plug or lure is in the water or when it is out and that lures and plugs and the like can easily be stored in a tackle box without any trouble of entanglement. The safety features of the arrangement of the present invention are obvious because it substantially eliminates the chances of hooking the arrangement accidentally either when casting or when attaching or changing the lures.

The present invention can be incorporated in floating or sinking lures or plugs. The tension of spring 26 can readily be varied to make it easy acting for relatively small or weak fish, or relatively stiff, as conditions may indicate. Furthermore, the hook arrangement can be manufactured in any size so that the invention has a wide field of use. Bait holders and the like can be connected with the hook assembly so that the hook assembly can be used with baits which, at the present time, are often mounted directly on the hook itself.

FIGURE 9 shows a modification wherein a substantially conventional hook 90 is disposed in a cavity 92 of body 94 with the eye 96 of the hook pivotally retained in the cavity. Hook 90 can swing from a first retracted position wherein it is fully disposed within the cavity to a second extended position, in which it is illustrated in FIGURE 9 wherein at least the point end 98 of the hook projects from the body. The shank portion 100 of the hook is, in this case, unbent and, as mentioned, a substantially conventional hook can be used. A spring 102 is provided continuously urging the hook toward its first or retracted position in the cavity. This spring may be a length of wire disposed in a groove 104 formed in the body and having its outer end bent down over the front side of the shank of the hook.

The pulling element 106, which may be a wire or a strand of flexible material, leads into the body along a groove 108 which is curved so that the end of the pulling strand 106 adjacent the hook extends substantially at right angles to the shank. In the FIGURE 9 modification it is important for the pulling strand to be of a flexible nature and it might, for example, comprise a nylon or other strand, monofilament preferably, and it might or might not have a metal eye on the hook end for engagement with the shank of the hook to pivot the hook between its first and second positions.

The outer end of the pulling strand would have means for connection thereof to a line. The FIGURE 9 modification could be built into any sort of body such as has already been described in connection with the first modification.

I claim:

1. In a retractable hook assembly; a body having two shallow cavities therein, said cavities being in parallel spaced substantially co-extensive relation to each other, an opening on each side of said body communicating with a respective one of said cavities, a fish hook mounted in each cavity, each hook having an eye on one end and a point on the other end and a shank extending between said ends, pocket means in each cavity embracing the eye of the respective hook holding the hook captive in its cavity and supporting the respective hook for pivotal movement in the body between a first position wherein the hook is entirely disposed within its respective cavity and a second position wherein the point end of the hook extends from the body through the respective opening therein, a spring in the body acting on each hook and biasing each hook toward its said first position, a pulling strand connected to each hook operable when pulled to move the respective hook toward its said second position, said pulling strands extending in substantially parallel closely spaced relation from said hooks along said body and out through a common end of said body for being connected to a single line whereby both of said hooks can be actuated between their said first and second positions simultaneously.

2. In a retractable hook assembly; a body having two shallow cavities therein, said cavities being in parallel spaced substantially co-extensive relation to each other, an opening on each side of said body communicating with a respective one of said cavities, a fish hook mounted in each cavity, each hook having an eye on one end and a point on the other end and a shank extending between said ends, pocket means in each cavity embracing the eye of the respective hook holding the hook captive in its cavity and supporting the respective hook for pivotal movement in the body between a first position wherein the hook is entirely disposed within its respective cavity and a second position wherein the point end of the hook extends from the body through the respective opening therein, a spring in the body acting on each hook and biasing each hook toward its said first position, a pulling strand connected to each hook operable when pulled to move the respective hook toward its said second position, said pulling strands extending in substantially parallel closely spaced relation from said hooks along said body and out through a common end of said body for being connected to a single line whereby both of said hooks can be actuated between their said first and second positions simultaneously, said assembly having substantially flat sides parallel with said cavities, and a resilient rubber-like member having a cavity into which the body of said hook assembly is removably inserted and having openings therein registering with the openings in the sides of said body of the assembly to permit actuation of said hooks between their said first and second position.

References Cited

UNITED STATES PATENTS

| 1,021,699 | 3/1912 | Nordlund | 43—35 |
| 1,486,028 | 3/1924 | Meighen | 43—35 |
| 1,670,174 | 5/1928 | Wiersma | 43—35 |
| 1,890,266 | 12/1932 | Schadell et al. | 43—35 |
| 2,606,386 | 8/1952 | Seabeck | 43—37 |

SAMUEL KOREN, *Primary Examiner.*

D. J. LEACH, *Assistant Examiner.*